May 4, 1965
R. J. PETROFF
3,181,379
INTERMITTENT MECHANISM
Filed Feb. 4, 1963
2 Sheets-Sheet 1
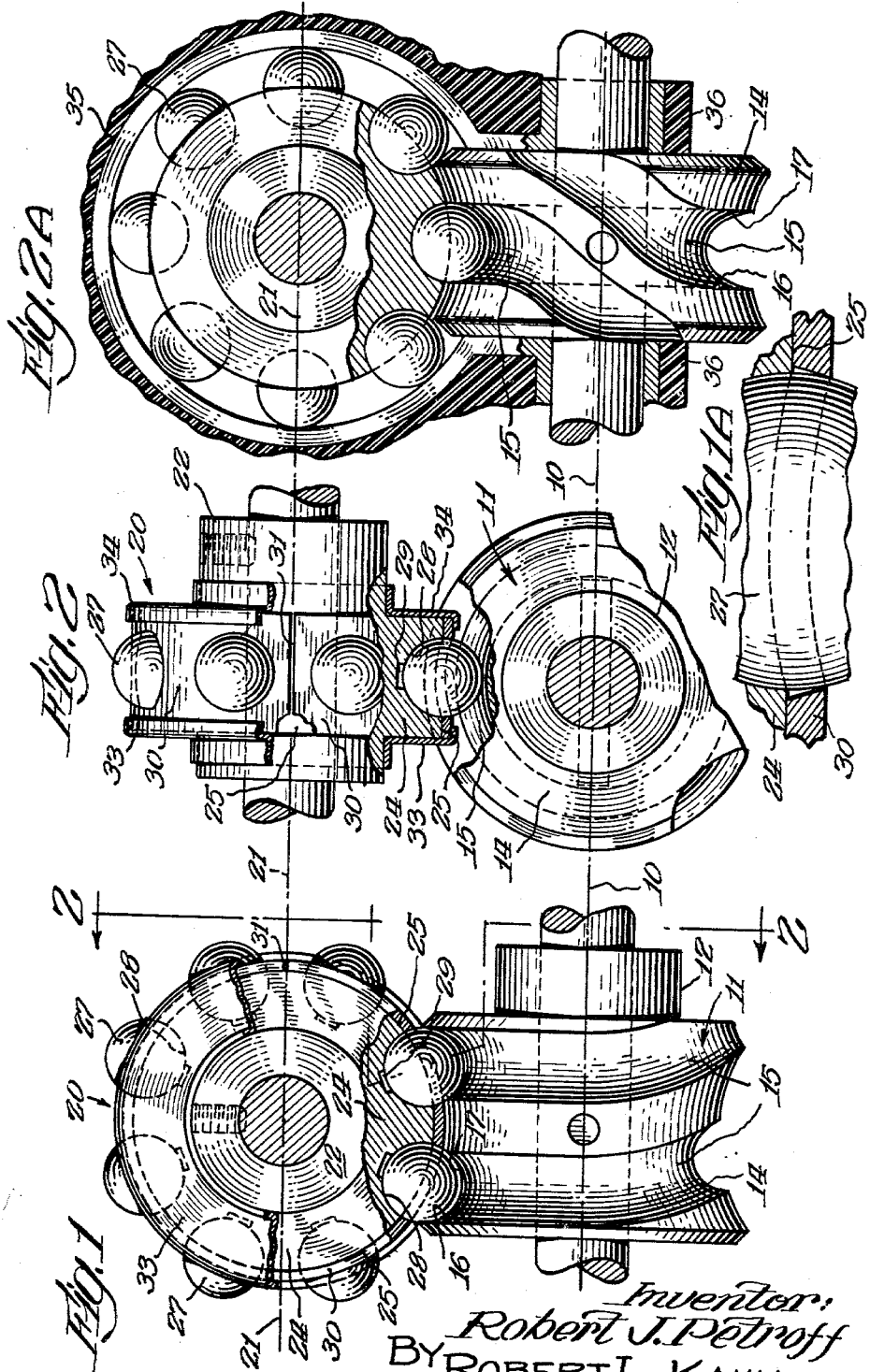
Inventor:
Robert J. Petroff
BY Robert L. Kahn
ATTY.

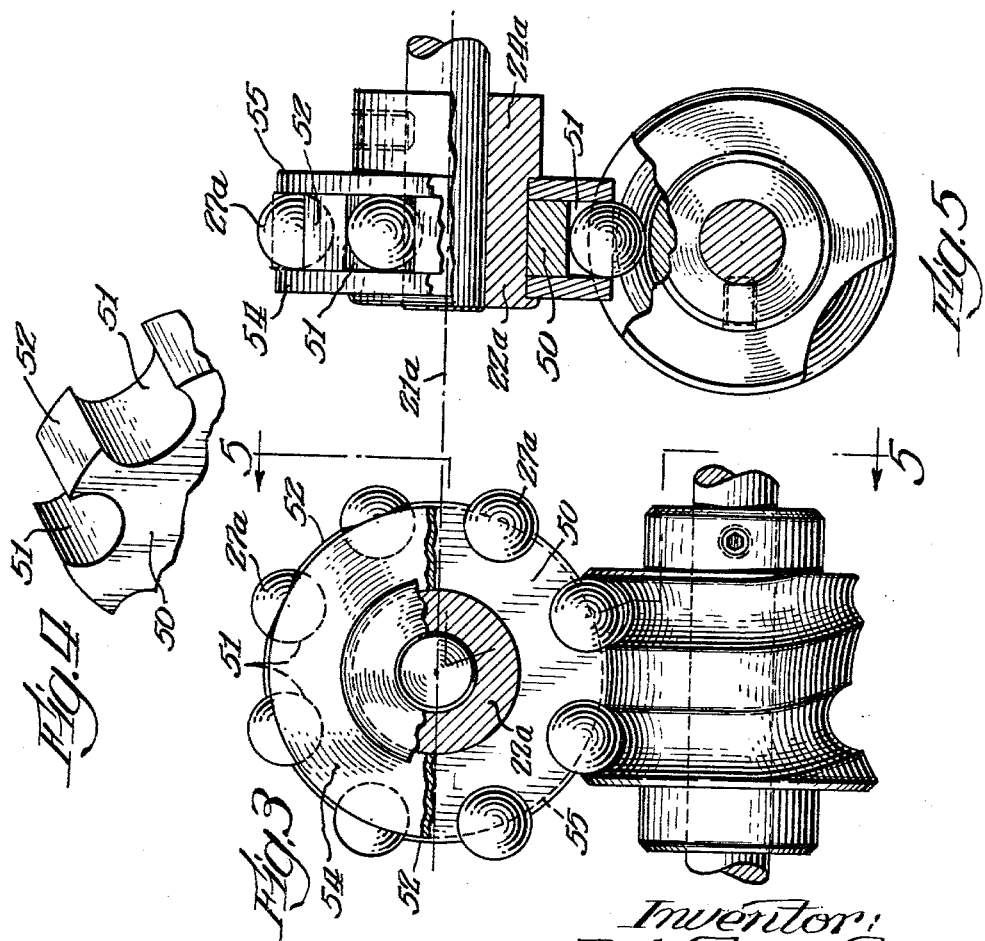

United States Patent Office 3,181,379
Patented May 4, 1965

3,181,379
INTERMITTENT MECHANISM
Robert J. Petroff, Lombard, Ill. (% R. Petroff Associates, 5101 W. Lake St., Chicago 44, Ill.)
Filed Feb. 4, 1963, Ser. No. 255,982
5 Claims. (Cl. 74—84)

This invention relates to an intermittent mechanism and more particularly to a mechanism utilizing a modified worm and gear arrangement.

There are many different types of mechanisms which can be used for obtaining intermittent motion. However, where heavy duty or high speed, or both, are involved, conventional intermittent mechanisms leave much to be desired. For large sizes, a roller gear type of intermittent motion utilizing a modified worm and gear construction is used but is quite expensive. Such a construction relies upon a worm-like cam track which may have a constant or variable pitch. The follower gear in such a construction is modified by having roller bearings which are mounted on radially extending studs. The bearings have outer races which ride in the cam track and transmit the force from the cam track to the follower spider or similar body. Such a construction is expensive due to the cost of the bearings, as well as machine work involved.

The loading of the follower is limited by considerations of stud dimensions and outer race thickness. Such a construction can not be practically miniaturized. The cost of manufacture of such mechanisms is considerable due to the accuracy requirements of the various machining operations for locating studs and controlling the directions thereof.

No matter how well such a mechanism is made, it is impossible to avoid considerable vibration and noise due to inherent difficulties in the design. Thus the outer race riding in a cam track can ride only one cam track wall and must be clear of the oposite wall because diametrically opposed outer race points move in opposite directions. The outer race clearance from the opposite cam track wall results in backlash and vibration. With conventional roller gear mechanism, a stud bearing element during a cam engagement, must change direction of rotation of the outer race or sleeve. This requires that the stud and bearing thereon go through the lost motion range required for clearance between the bearing sleeve surface and the cam groove wall not contacted. In other words, a bearing sleeve will first roll against one cam side wall and then must shift to the opposing side wall some time before leaving the cam groove. To some extent, this has been met by having at least two outer races contacting or bearing against the opposite side walls of a cam flange. However, such a recourse imposes limitation on the shape of the cam.

Insofar as miniaturization is concerned, a roller gear type of mechanism is impractical to use. This is partly due to the difficultiy in having studs of small enough diameter and having outer races thin enough. In addition, such a construction is not only fragile, but involves the expense of complete anti-friction bearing assemblies on the studs.

This invention provides a structure which has outstanding advantages for large sizes and equally applicable for small sizes. For both types of applications, a structure embodying the present invention is susceptible to quantity manufacture at low cost but with great accuracy.

In general, a structure embodying the present invention utilizes a spider or follower body containing sockets or recesses, in each of which is disposed a ball. These balls are of the kind used in ball bearings and are available in large quantities in many different sizes, at cheap prices, to great accuracy. The balls are maintained in the sockets or recesses in the follower body by various means. A socket or recess in the follower body may be either generally hemispherical or generally conical. In any event, the socket surface against which a ball may turn or roll will have a surface of revolution which can be generated accurately and economically by conventional means and procedures.

In the new mechanism, the cam track for driving the balls can engage each ball at two points on opposite sides of a cam track. This becomes possible for the reason that a ball will tend to roll along a cam track and can engage the track at two points of contact. Under heavy load, the region of contact between a ball and a cam track will become enlarged to provide a small area of contact. This phenomenon is well known in conventional ball bearings where the balls roll in a toric surface in the ball race, the spherical surface having a radius somewhat larger than the radius of the ball itself.

The portion of a ball which rides in a cam track in the new motion will project beyond the body of the follower and, in general, will make it possible for a ball to follow a cam track easier than a bearing sleeve. This is particularly true if the cam track changes pitch suddenly, in which case a conventional roller bearing frequently has difficulty in negotiating the turn of a cam track or groove. Various means may be used for retaining the balls in the sockets of the follower body. As a result, it is possible to have the ball with more or, in some instances, less than one-half of the surface area of the ball within the boundaries of the follower body in which a ball is retained.

In general, if a ball is retained in the follower body by means supported by the follower body, then somewhat over half of the ball area must be within the outlines of the follower body and leave somewhat less than one-half of the ball surface for operation in a cam track. On the other hand, if the means for retaining a ball in a socket is external of the follower body and separate therefrom, then over one-half of the area of the ball may be available for use in following a cam track. In the operation of a device embodying the present invention, when a ball is between a cam track and a follower body and is active in transmitting force from the track to the body, the force acting on the ball tends to push the ball into the body socket so that it becomes possible to have a major portion of the ball area within the cam track groove.

Insofar as the movement of a ball in a body socket or recess is concerned, this will be generally a sliding motion of one with respect to the other so that lubrication will generally be necessary except for light application. In any case, it is possible to relieve the bottom of the socket or recess for a ball. This will store oil and be more economical to manufacture.

A structure embodying the present invention is inherently capable of great accuracy and also is free of backlash which is generally inherent in roller bearing intermittent motion mechanisms. Consequently, a structure embodying the present invention is capable of use under various conditions where great accuracy of index action is necessary or where high speed is necessary. The latter becomes possible as the result of the fact that the follower is at all times under the full control of the cam track and cannot have any free motion of its own. By virtue of the generally balanced construction, as well as the manner in which the balls roll or slide, a high degree of efficiency is obtainable. All these advantages can be attained in a structure embodying the present invention at comparatively low cost.

Insofar as miniaturization is concerned, there is no practical lower limit to the size of an intermittent mechanism embodying the present invention. This is particularly true when it is considered that balls for ball bearings are obtainable in very small sizes and that it is possible to obtain hemispherical or conical sockets for any size balls with great accuracy at a low cost. In fact, a structure embodying the present invention is susceptible to manufacture using moulded plastics for the cam track and follower body with only balls to be obtained usually in the market. As a rule, steel balls available in the market will be used. It is understood, however, that a ball may be of any material and for certain purposes it may be desirable to have non-magnetic or non-metallic balls.

One form of an intermittent motion mechanism embodying the present invention has a follower providing a cylindrical surface containing recesses or sockets for accommodating balls. A follower will have one ball for each recess or socket. A recess or socket for accommodating a ball may be generally hemispherical or conical.

Cooperating with the follower structure generally described above will be a globoidal driving cam, whose groove or walls will be provided with suitable surfaces for cooperating with the projecting portion of the ball. The principal thrust of the cam groove or wall upon the balls will be in such direction as to force each ball into its socket and thus result in a compressive force upon a ball and the body of the follower material containing the ball socket.

In the modifications embodying the present invention, the driver and follower axes can have the same geometrical relationship to each other, one being perpendicular and laterally offset from the other. It is possible to have the two axes offset, but not perpendicular. In all cases, spherical balls are retained in recesses or sockets in a follower member and will be constrained to move in a generally circular path around the axis of the follower. The balls will in all cases be set or mounted in recesses or sockets in the follower.

By virtue of the present invention, the amount of area available for supporting the thrust load between the driver and follower in this general type of mechanism is greatly increased, while the volume of material to which the load is applied is greatly decreased. As a result, the load impressed upon the follower is in the form of compression upon one or more balls which can be made of a material such as steel, having great compressive strength. The follower body containing the recesses or sockets for accommodating the balls can be as strong as desired and free of the weaknesses of a follower having radially projecting studs, as is true of conventional roller bearing intermittent drive mechanisms.

Due to the fact that a ball in the follower travels along a cam track, it is possible to make a track accurately and have a ball roll along the track. The ball is free to turn in any direction and will thus assume a direction of rotation involving minimum friction between ball and track walls. Thus a ball can roll forwardly along a cam track and have minimum slipping in the track.

For a full explanation of the invention, reference will now be made to the drawings wherein:

FIGURE 1 is an elevation, with certain parts broken away, of one embodiment of the invention.

FIGURE 1A is an enlarged detail illustrating the construction of the ball retaining band.

FIGURE 2 is a view with certain parts broken away along line 2—2 of FIGURE 1.

FIGURE 2A is a view with certain parts broken away, illustrating a modification of the structure disclosed in FIGURE 1.

FIGURE 3 is an elevation, with certain parts broken away, of a structure having a modified follower body.

FIGURE 4 is an enlarged perspective view of a portion of the structure illustrated in FIGURE 3.

FIGURE 5 is a view along broken line 5—5 of FIGURE 3, with certain parts broken away and other parts shown in full for ease of illustration.

Referring first to FIGURES 1 and 2, 10 designates a drive axis about which worm type of cam 11 can rotate. The direction of rotation is unimportant. This cam consists of hub portion 12 and cam body 14. Cam body 14 is provided with worm type of cam track 15 which extends around axis 10. Cam track 15 has side walls 16 and 17. If the track pitch is constant, the track describes a worm. However, the pitch of the track need not be constant, so that, generally speaking, cam track 15 may be considered as a worm type cam track. It is understood that the cam track may have any desired shape to secure desired movements. Thus it is possible to provide an index action wherein a sudden movement is followed by a dwell. Cam 11 has the general outline of an hour glass to provide a globoidal cam. The outline of this globoidal cam will depend upon the radius of the rotatable member, to be described, which cooperates with this cam. The larger the radius, the more nearly body 14 can approach a cylinder, with track 15 providing a conventional cam track along a cylindrical body.

Cooperating with cam track 15 is driven member 20 rotatable about axis 21. Axis 21 is shown at right angles to and laterally offset from axis 10. Axis 21 could have somewhat different angular relationship. Driven member 20 consists of hub 22 and body portion 24. Body portion 24 has cylindrical outer surface 25 whose axis is coincident with axis 21. Disposed at equally spaced intervals around the axis of 21 are balls 27 resting in substantially hemispherical recesses or sockets 28 provided in surface 25. Recesses or sockets 28 are undercut at 29 and are deep enough so that the center of a ball can be at or close to the surface defined by cylindrical surface 25 of driven member 20. Balls 28 can be of steel, available in the market for use in ball bearings. The balls are maintained in position by strap 30 of metal such as brass, having apertures therethrough at spaced intervals to accommodate the balls. The apertures in strap 30 are just large enough to hold the balls in their recesses or sockets. Strap 30 is made from a flat strip of metal which is bent around so that ends 31 are adjacent to each other. The strap is maintained in desired position around body portion 24 by flanged retainers 33 and 34 disposed on opposite sides of body portion 24.

The engagement of the ball surface and the track surface can be a true rolling action with minimum friction. The engagement between the surface of a ball and the surface of the recess or socket in which the ball is riding in driven member 20 will be sliding. However, the contact area is so great that the unit pressure of ball on the socket face can be low enough so that maintaining a lubricating film is no problem.

It is necessary for proper operation of the mechanism disclosed in FIGURES 1 and 2 to mount the two members on their respective axes 20 and 21 so that these members can not move their axes away from each other. It may be desirable to mount them in such a fashion that driver member 11 and driven member 20 are pressed toward each other for pre-loading engagement. As long as the center of each ball is inside of the outer surface of strap 30, the balls will be stable and will have no tendency to be pushed out of their sockets. Any tendency for balls to be moved out of their sockets will be resisted by strap 30 and any tendency for strap 30 to rotate about body portion 24 will be resisted by retainers 33 and 34, particularly the overlying flange parts overlying strap 30. The force created by the cam track upon a ball will tend to cause rotation of the driven member and will push the ball into its socket. For this reason, it is desirable to have the sockets finished accurately and well lubricated.

For light applications it is possible to make cam 11 and track 15 out of plastic, such as nylon or styrene, high impact polyethylene or other material which will not bind. Insofar as the balls are concerned, these can be of steel readily available on the market or of any suitable material such as metal, glass, plastic, etc. Body portion 24 should preferably be of a metal or material which is different than the balls and may, for example, be of cast iron, brass, bronze, plastic, or the like.

Cam track 15 may have any desired shape to secure any desired type of motion of driven member 20. This motion may be continuous or intermittent and from the nature of the mechanism both the driver and the driven members can be operated at high speed with a minimum of noise, vibration and undue stress on various parts. By having cam track 15 accurate, the entire mechanism can be made very accurate with little expense.

As illustrated in FIGURES 1 and 2, cam track 15 is undercut so that side walls 16 and 17 provide essentially point contact with a ball. In the modification illustrated in FIGURES 1 and 2, it is possible to relieve the outer wall of the cam track at the ends of the cam body and depend upon two adjacent balls to ride the separating cam wall between two adjacent track portions. This is possible in that portion of the cam track where two adjacent balls would be engaged for determining a dwell position. This dwell position could thus be accurately determined and maintained with no backlash.

In FIGURE 2A, a modification is illustrated wherein a dwell position is determined by one ball. In such case, the one active ball during the dwell position will maintain point contact with the cam track on opposite side walls of the track. Such a dwell position is possible without any backlash or play and is impossible to obtain with any roller bearing type of mechanism.

FIGURE 2A also modifies the structure illustrated in FIGURES 1 and 2 by having means external to the follower body for confining the balls to the sockets or recesses in the follower body. In this modification, housing 35 has a cylindrical interior surface for accommodating the follower body and balls except where the balls engage the driving cam. The remainder of the housing may have any desired construction and may include journals or bearings for the shaft of the follower assembly.

Housing 35 includes as part thereof throat portions 36 which are designed to function as journals for the cam shaft and are adapted to accommodate the cam. In asssembling the mechanism, the follower will first be disposed within housing 35, it being understood that housing 35 will have at least one end open for receiving the follower body. The balls can be introduced through the throat prior to the introduction of the cam and cam shaft, each ball being disposed in its socket at the throat and then the follower rotated to expose the next socket. After the various balls are in position and the structure as illustrated in FIGURE 2A is up-side-down, the cam minus the shaft is positioned between the two parts of throat 36, after which the cam shaft is pushed through the journals and the cam. The shaft and cam may be locked together by any suitable means such as set screws or keys.

FIGURES 3 to 5 inclusive show a modification of the structure of FIGURES 1 and 2. The cam structure can be the same as in FIGURES 1 and 2. The follower has hub portion 22a and body portion 24a. Press fitted over hub portion 22a is circular ball retainer 50 whose thickness is slightly greater than the diameter of balls 27a. Ball retainer 50 has recesses or sockets 51 provided by drilling passages along its thickness at spaced intervals along the arc of a circle. The circle has its center at the retainer center (at axis 21a of the follower) and the arc of the circle is a short distance inside edge 52 of the retainer. The passages through the retainer are cylindrical but mutilated by being incomplete. Each passage subtends a bit more than 180° of cylinder surface and has a diameter slightly larger than ball 27a. The ball is locked in its socket by side plates 54 and 55 on opposite sides of retainer 50 but is free to roll therein. Plates 54 and 55 are circular washers whose diameter is equal to the diameter of retainer 50. The overhang of retainer material at edge 52 also locks each ball in. Hub 22a has the material turned over at the end to hold the assembly intact.

What is claimed is:

1. A ball gear type of intermittent motion mechanism comprising a cam body having a straight axis and having a globoidal worm type of cam groove, a follower including a body having a plurality of ball accommodating sockets with one ball for each socket, each socket having the ball-engaging portion in the shape of a surface of revolution so that a ball and socket contact each other at least along the circumference of a circle, a ball having a substantial portion thereof projecting outside of the follower, said follower being movable about an axis which is perpendicular to and laterally offset from the cam axis, said sockets being in a circular pattern and having a spacing corresponding to the cam pattern and movable with body rotation in planes normal to the body axis, means for maintaining each ball in its socket, means for maintaining said cam and follower in meshing engagement so that as said cam rotates, the projecting parts of the balls are successively engaged to cause said follower to turn, said cam groove having a radius of curvature which is greater than that of the ball whereby a ball will engage a cam groove wall at no more than two points.

2. The construction according to claim 1 wherein said follower body has the outer surface thereof cylindrical concentric with the axis of the follower body, said ball sockets being formed by a series of recesses disposed in the peripheral portion of said body, said recesses being mutilated cylindrical surfaces extending parallel to the axis of the body and being spaced near enough to the periphery of the body so that said cylinders are mutilated and have the peripheral surface of the body cut, each said recess having a diameter slightly greater than the diameter of a ball, said body having a thickness along the axis thereof slightly greater than the diameter of a ball and a ball disposed in each recess and having less than one-half of the ball projecting beyond the periphery of said body, a plate disposed on each side of said body and large enough to lock a ball in said recess with the overhanging part of said body at each recess preventing outward movement of a ball.

3. The construction according to claim 1 wherein said ball retaining means comprises an outer raceway for said balls, said outer raceway extending around that portion of the follower body which is free of said cam and having the raceway surface close enough to said balls so that said balls can roll during rotation and be prevented from falling out from the sockets.

4. The construction according to claim 1 wherein said ball retaining means comprises a housing, means for supporting said cam shaft and follower body in said housing in predetermined relation, said housing including a cylindrical wall which is disposed around the follower body and is close enough to the balls to retain them in position, said cylindrical wall being incomplete to permit said cam to engage successive balls.

5. The construction according to claim 1 wherein the follower sockets are undercut so that all of the area of a ball within a follower socket is not engaged by socket material.

References Cited by the Examiner

UNITED STATES PATENTS

| 507,681 | 10/93 | Hoyt | 74—464 |
|---|---|---|---|
| 635,875 | 10/99 | Smith | 74—464 |
| 815,979 | 3/06 | Richards | 74—84 |
| 1,164,847 | 12/15 | Neubauer | 74—464 |
| 1,307,462 | 6/19 | Steffensen | 74—464 |
| 2,714,315 | 8/55 | Reader | 74—465 |
| 3,049,017 | 8/62 | McDonald | 74—84 |
| 3,083,635 | 4/63 | O'Hare | 74—84 |

BROUGHTON G. DURHAM, *Primary Examiner.*